(12) United States Patent
Finn

(10) Patent No.: US 9,190,077 B2
(45) Date of Patent: Nov. 17, 2015

(54) DATA STORAGE TAPE WITH RANDOM ACCESS DATA

(71) Applicant: International Business Machines Corporation, Armonk, NY (US)

(72) Inventor: Peter G. Finn, Markham (CA)

(73) Assignee: GLOBLAFOUNDRIES INC., Grand Cayman (KY)

( * ) Notice: Subject to any disclaimer, the term of this patent is extended or adjusted under 35 U.S.C. 154(b) by 0 days.

(21) Appl. No.: 14/687,050

(22) Filed: Apr. 15, 2015

(65) Prior Publication Data

US 2015/0221323 A1 Aug. 6, 2015

Related U.S. Application Data

(63) Continuation of application No. 13/974,175, filed on Aug. 23, 2013, now Pat. No. 9,019,654.

(51) Int. Cl.

| | |
|---|---|
| *G11B 15/00* | (2006.01) |
| *G11B 5/008* | (2006.01) |
| *G06F 3/06* | (2006.01) |
| *G11B 5/78* | (2006.01) |

(52) U.S. Cl.
CPC .......... *G11B 5/00813* (2013.01); *G06F 3/0611* (2013.01); *G06F 3/0643* (2013.01); *G06F 3/0682* (2013.01); *G06F 2003/0698* (2013.01); *G11B 5/78* (2013.01)

(58) Field of Classification Search
CPC .......... G11B 15/00; G11B 5/78; G11B 5/008; G11B 5/00813
USPC .......................................................... 360/93
See application file for complete search history.

(56) References Cited

U.S. PATENT DOCUMENTS

| | | | |
|---|---|---|---|
| 2,908,767 A | 10/1959 | Fritzinger | |
| 4,181,426 A | 1/1980 | Blossey et al. | |
| 5,979,814 A | 11/1999 | Childers | |
| 6,633,449 B1 | 10/2003 | Anderson et al. | |
| 7,085,091 B1 | 8/2006 | Kientz | |
| 7,349,175 B2 * | 3/2008 | McIntosh et al. | 360/91 |
| 7,372,657 B2 | 5/2008 | Gill et al. | |

(Continued)

FOREIGN PATENT DOCUMENTS

JP        07021070 A  *  1/1995  .............. G06F 12/00

OTHER PUBLICATIONS

Marks, P., "Cassette tapes are the future of big data storage," [online] NewScientist Tech, No. 2887, Oct. 19, 2012, © Reed Business Information Ltd. [retrieved Aug. 22, 2013] retrieved from the Internet: <http://www.newscientist.com/article/mg21628875.500-cassette-tapes-are-the-future-of-big-data-storage.html>, 3 pgs.

(Continued)

*Primary Examiner* — Allen T Cao
(74) *Attorney, Agent, or Firm* — Cuenot, Forsythe & Kim, LLC

(57) ABSTRACT

Arrangements relate to a data storage system. The data storage system can include a data storage tape. The data storage tape can be arranged in a concertina format. In such a format, the data storage tape can include a plurality of tape segments. Each tape segment can be separated from a neighboring tape segment by a fold. In some arrangements, the data storage tape arranged in a concertina format can be received within a housing.

11 Claims, 12 Drawing Sheets

(56) References Cited

U.S. PATENT DOCUMENTS

| | | |
|---|---|---|
| 7,835,103 B2 | 11/2010 | Anderson et al. |
| 8,041,921 B2 | 10/2011 | Ashton et al. |
| 8,139,311 B2 | 3/2012 | Oishi |
| 9,019,654 B2 | 4/2015 | Finn |
| 2007/0236817 A1* | 10/2007 | Taruisi .......................... 360/18 |
| 2012/0281307 A1 | 11/2012 | Argumedo et al. |
| 2015/0055245 A1 | 2/2015 | Finn |

OTHER PUBLICATIONS

Moore, F., "LTFS Takes Tape to the Next Level," [online] Horison Information Strategies, Horison, Inc., Nov. 16, 2011, 6 pg.

U.S. Appl. No. 13/974,175, Non-Final Office Action, Sep. 17, 2014, 6 pg.

U.S. Appl. No. 13/974,175, Notice of Allowance, Dec. 19, 2014, 5 pg.

* cited by examiner

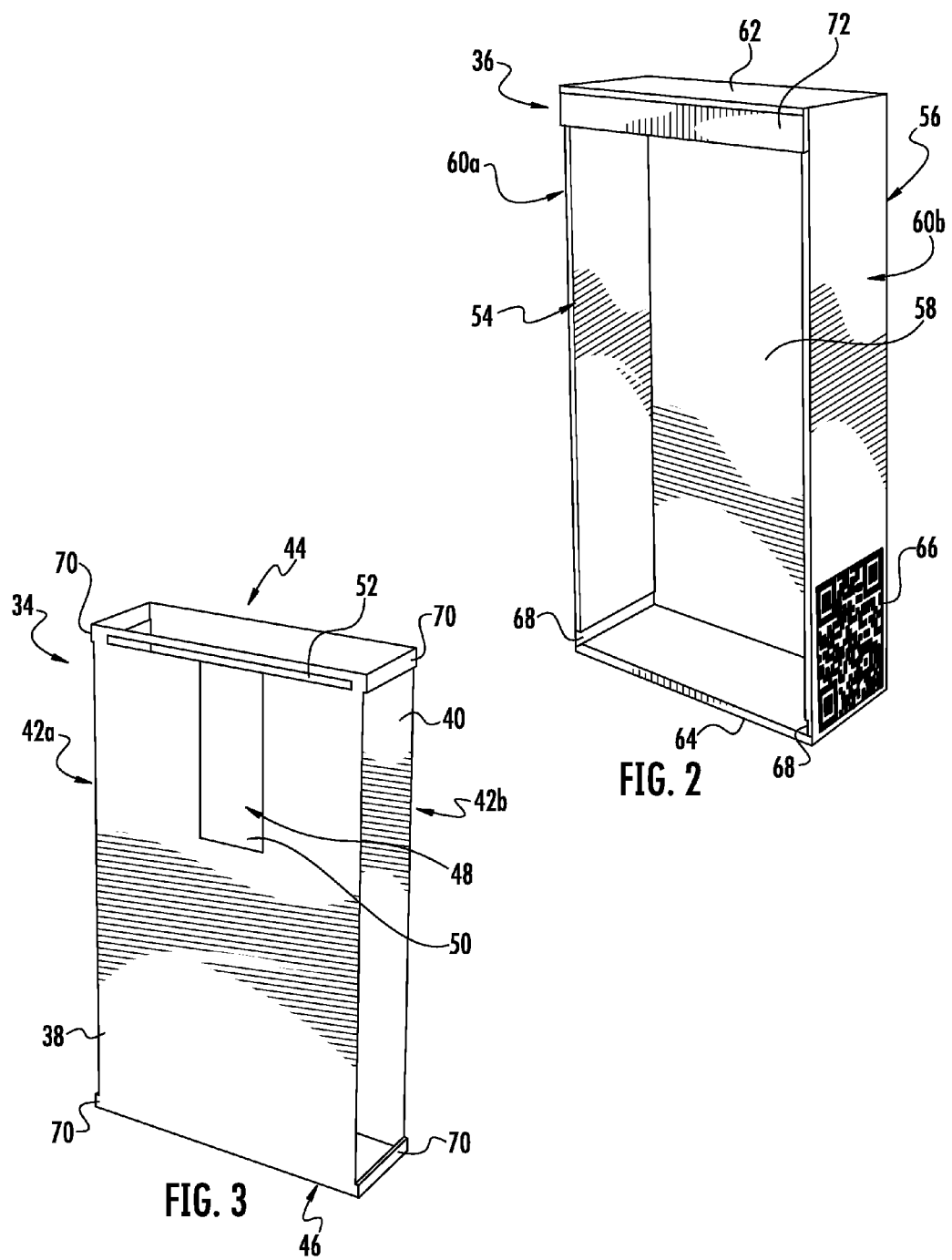

DATA STORAGE TAPE WITH RANDOM ACCESS DATA

CROSS-REFERENCE TO RELATED APPLICATIONS

This application is a Continuation of U.S. application Ser. No. 13/974,175, filed on Aug. 23, 2013.

BACKGROUND

Arrangements described herein relate to tape-based data storage systems.

Current demands for Random Access data storage have been met by hard disk-based systems. Recently, business data requirements have increased dramatically; consequently, there has been significant growth in the amount of data storage needed. However, current technology has not been able to increase hard disk density to keep pace with the increasing data storage demands in order to provide a cost effective solution.

Data can be stored on a tape-based storage system. There has been relatively little development of tape-based data storage system over the last 30 years. Recent advances in tape using barium ferrite can store up to 35 TB of data in a space of 10 centimeters by 10 centimeters by 2 centimeters. Despite the ability for providing such high density, this type of medium only allows data access using sequential read/write methods. In such methods, tape is streamed from one spool to another spool and either written or read during this spooling process. It is not possible to advance to a particular location on the tape and access the data without waiting for a period of time for the system to spool to the desired location on the tape. This period of time can be particularly lengthy if the data is at or near the end of the tape.

SUMMARY

One or more embodiments disclosed within this specification relate to data storage systems and, more particularly, to data storage tape.

An embodiment can include a data storage system. The system can include a data storage tape. The data storage tape can be arranged in a concertina format. The data storage tape can include a plurality of tape segments. Each tape segment can be separated from a neighboring tape segment by a fold.

Another embodiment can include a tape drive for a data storage tape arranged in a concertina format. The tape drive can include a first station configured to receive a data storage tape arranged in concertina format. The first station can be configured to selectively release a portion of the data storage tape that substantially corresponds to an identified location on the data storage tape. The released portion of the data storage tape can be supplied from the first station toward a second station. The second station can be configured to receive at least a portion of the data storage tape released from the first station. The first station and the second station can be vertically spaced from each other. At least a portion of the first station can be substantially vertically aligned with at least a portion of the second station. The tape drive can include one or more tape heads operatively positioned between the first and second stations. The one or more tape heads can be configured to selectively read data from or write data to the data storage tape arranged in concertina format.

Another embodiment can include a method for non-sequential access of data from a data storage tape. The data storage tape can be arranged in a concertina format such that the data storage tape includes a plurality of tape segments. Each tape segment can be separated from a neighboring tape segment by a fold. An identified data area of the data storage tape can be non-sequentially accessed. Data can be selectively read from or written to the tape storage tape within the identified data location.

BRIEF DESCRIPTION OF THE SEVERAL VIEWS OF THE DRAWINGS

FIG. 2 shows an example of an inner cartridge in accordance with one embodiment disclosed within this specification.

FIG. 3 shows an example of an outer cartridge in accordance with one embodiment disclosed within this specification.

DETAILED DESCRIPTION

Figure 1:
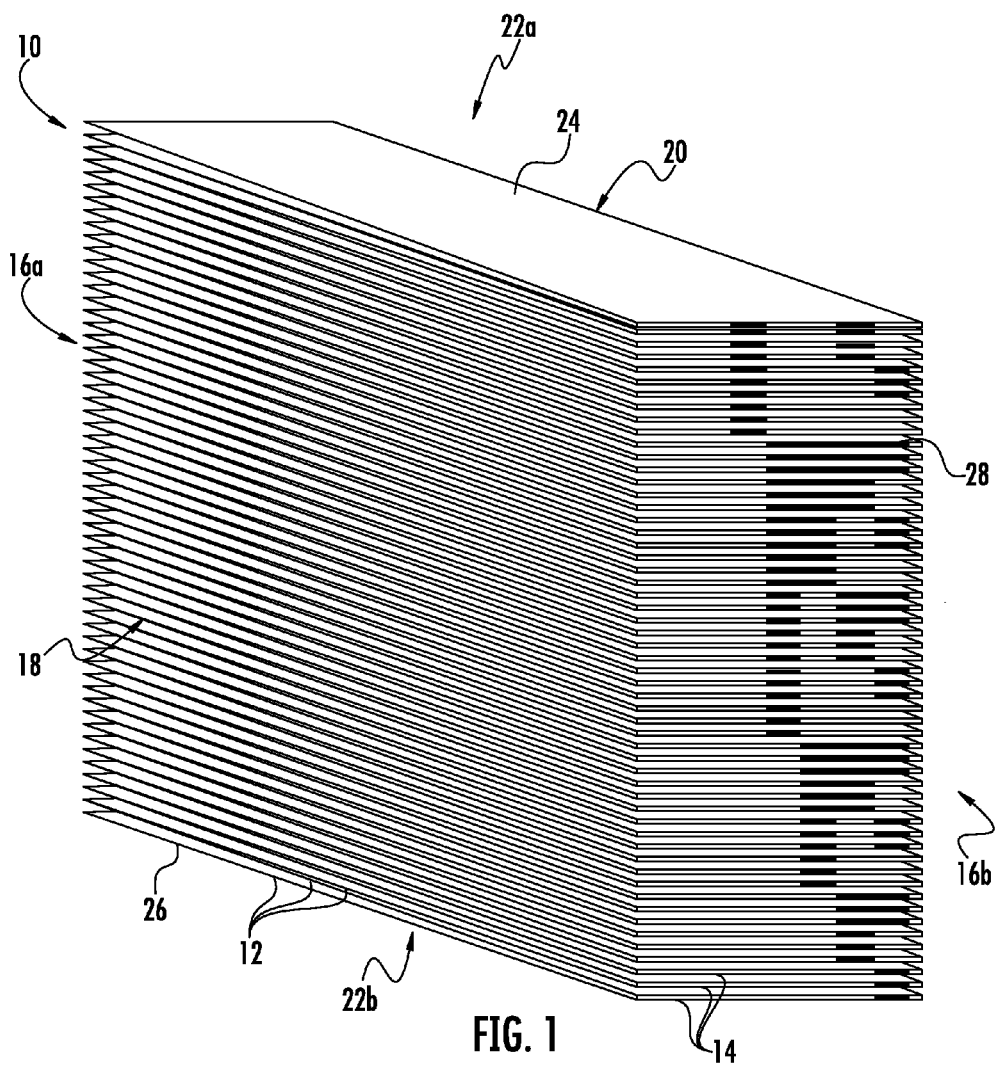
FIG. 1 shows an example of a data storage tape arranged in a concertina format in accordance with one embodiment disclosed within this specification.

Arrangements described herein relate to a data storage systems, methods and related systems. Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Arrangements are shown in FIGS. 1-13, but the embodiments are not limited to the illustrated structure or application.

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features. In addition, numerous specific details are set forth in order to provide a thorough understanding of the embodiments described herein. However, it will be understood by those of ordinary skill in the art that the embodiments described herein can be practiced without these specific details.

In one arrangement, a data storage tape 10 can be provided, as is shown in FIG. 1. "Data storage tape" is any tape-based medium on which data can be stored, accessed, and read. The data storage tape 10 can be made of any suitable material. In one implementation, the data storage tape 10 can include barium ferrite particles. The data storage tape 10 can be magnetic tape.

The data storage tape 10 can be arranged in a concertina format. A "concertina format" means that the data storage tape is repeatedly folded upon itself in a continuing pattern. As a result, the data storage tape 10 can include a plurality of tape segments 12. Each tape segment 12 can be separated from a neighboring tape segment by a fold 14. The individual tape segments 12 can be substantially equal in length. However, in some implementations, one of more of the tape segments 12 can be unequal in length to one or more of the other tape segments 12.

When arranged in a concertina format, the data storage tape 10 can include opposing first and second tape fold sides 16*a*, 16*b*. The tape fold sides 16*a*, 16*b* can be formed by the plurality of folds 14. When the data storage tape 10 is arranged in a concertina format, the folds 16 can alternate from being on the first tape fold side 16*a* and the second tape fold side 16*b*. The data storage tape 10 can also include an opposing front side 18 and back side 20. The data storage tape 10 can include opposing outer end faces 22*a*, 22*b*.

The data storage tape 10 in concertina format can include a first end tape segment 24 and second end tape segment 26. The first end tape segment 24 can define one of the outer end faces 22*a* of the data storage tape 10 in concertina format. The second end tape segment 26 can define one of the outer end faces 22*b* of the data storage tape 10 in concertina format. It will be appreciated that, depending on the orientation, the first end tape segment 24 or the second end tape segment 26 is a portion of the data storage tape 10 that can be quickly accessed due to its location at the beginning of the data storage tape 10.

In one arrangement, a file allocation table can be stored on the first end tape segment 24 and/or the second end tape segment 26. A "file allocation table" is any data or information that describes a general and/or specific location of content on the data storage tape. The file locations can be associated with a group area of the data storage tape 10. The group area can include one or more tape segments 12. The data storage tape 10 can include a plurality of group areas. The plurality of group areas can include an equal number of tape segments, or one or more of the plurality of group areas can include a different number of tape segments. In one implementation, the file allocation table may be stored elsewhere on the data storage tape 10 or even somewhere other than on the data storage tape 10.

The data storage tape 10 arranged in concertina format can include machine-readable indicia 30 thereon. For instance, the machine-readable indicia 30 can be provided in any suitable location on an exterior portion of the data storage tape 10 arranged in concertina format. More particularly, the machine-readable indicia 30 can be provided on at least one of the tape fold sides 16*a*, 16*b* of the data storage tape 10 arranged in concertina format. Providing the machine-readable indicia 30 in such location can facilitate quick read/write access to any location on the data storage tape 10. The machine-readable indicia 30 can be included on the data storage tape 10 in any suitable manner, including, for example, by printing, stamping or marking.

The machine-readable indicia 30 can provide any suitable information. For instance, the machine-readable indicia 30 can represent a group area represented in the file allocation table. As an example, one or more of the folds 14 forming the first tape fold side 16*a* can include machine-readable indicia 30 that indicates that these folds 14 and the associated tape segments 12 belong to a first group area. Continuing with the example, one or more neighboring folds 14 forming the first tape fold side 16*a* can include machine-readable indicia 30 that indicates that these folds 14 and the associated tape segments 12 belong to a second group area.

The machine-readable indicia 30 can be provided in any suitable form, including, for example, binary encoding, barcodes (e.g., UPC, EAN, PDF417, QR code format, etc.), photosymbols, standard or specialized text, etc., or any future type of machine-readable indicia. The machine-readable indicia 30 can be read by, for example, a camera, scanner, optical reader or other device depending on the form of the machine-readable indicia 30.

The data storage tape 10 can be at least partially enclosed within a housing. Any suitable type of housing can be provided. In one embodiment, the housing can include an inner cartridge 34 and an outer cartridge 36. A "cartridge" means any suitable housing or container for receiving data storage tape. The data storage tape 10 arranged in concertina format can be received in the inner cartridge 34, and the inner cartridge 34 can be received in the outer cartridge 36. Each of these components will be described in turn below.

FIG. 2 shows an example of the inner cartridge 34. The inner cartridge 34 can have any suitable form. As is shown, the inner cartridge 34 can be generally rectangular in conformation. However, other conformations are possible. The inner cartridge 34 can be hollow. The inner cartridge 34 can be sized and/or shaped to receive the data storage tape 10 in concertina format therein.

The inner cartridge 34 can be made of any suitable material. For instance, the inner cartridge 34 can be made of any suitable type of plastic. The inner cartridge 34 can be made of a non-magnetic material.

The inner cartridge 34 can include a front wall 38 and a back wall 40. The inner cartridge 34 can include opposing lateral sides 42*a*, 42*b*. One or both of the lateral sides 42*a*, 42*b* can be at least partially open. In one implementation, a substantial majority of one or both of the lateral sides 42*a*, 42*b* can be open. The inner cartridge 34 can include a top side 44 and bottom side 46. The top side 44 and/or the bottom side 46 can be at least partially open. It will be understood that the terms "front," "back," "lateral," "top" and "bottom" and other relative spatial terms are used throughout this description merely for convenience to facilitate the description based on the orientation of illustrated elements, such as the inner cartridge shown in FIG. 2. However, it will be understood that these terms are not intended to be limiting.

The inner cartridge 34 can be a substantially rigid structure. The front wall 38 and/or the back wall 40 of the inner cartridge 34 can include a pliant region 48. A "pliant region" is an area that can readily ply, bend and/or flex to force or pressure. The pliant region 48 can have a greater degree of flexibility compared to the rest of the inner cartridge 34 when the same force or pressure is applied thereto. The pliant region 48 can be provided in any suitable location on the inner cartridge 34. For instance, the pliant region 48 can be provided in an upper portion of the inner cartridge 34. Alternatively or in addition, the pliant region 48 can be provided in a central portion of the inner cartridge 34.

The pliant region 48 can be formed in inner cartridge 34 any suitable manner. In one implementation, the pliant region 48 can be defined by a separate panel 50 of material operatively connected to cover a cutout in the inner cartridge 34. The term "operatively connected," as used throughout this description, can include direct or indirect connections, including connections without direct physical contact. In such case, the panel 50 can be operatively to an exterior surface of the front wall 38, an interior surface of the front wall 38 and/or within the cutout. The panel 50 can be operatively connected in any suitable manner, including, for example, one or more fasteners, adhesives, mechanical engagement, welding, brazing, just to name a few possibilities.

The pliant region 48 can have any suitable size and/or shape. For instance, the pliant region 48 can be generally rectangular in conformation, as is shown in FIG. 3. However, other confirmations are possible, including, for example, square, circular, oval, triangular, trapezoidal, polygonal, or irregular just to name a few possibilities.

The pliant region 48 can be sufficiently flexible so that when a force is applied to the pliant region 48 from outside the inner cartridge 34, at least a portion of the pliant region 48 can protrude beyond the interior face of the respective wall (e.g. the front wall 38) of the inner cartridge 34 and into engagement with the data storage tape 10 in concertina format.

The inner cartridge 34 can include one or more features to facilitate interaction with one or more components of a tape drive. For instance, the inner cartridge 34 can include a slot 52 in the front wall 38 and/or the back wall 40. The slot 52 can be located near an upper end of the inner cartridge 34. The slot 52 can permit an object to be inserted from outside the inner cartridge 52 into the interior of the inner cartridge 34. The slot 52 can have any suitable size and/or shape. In one implementation, the slot 52 can be substantially rectangular. As will be explained in greater detail later, the slot 52 can be used to facilitate the securing of the data storage tape 10 when the inner cartridge 34 is inverted such that the top side 44 is facing in a downward orientation.

Figure 4:
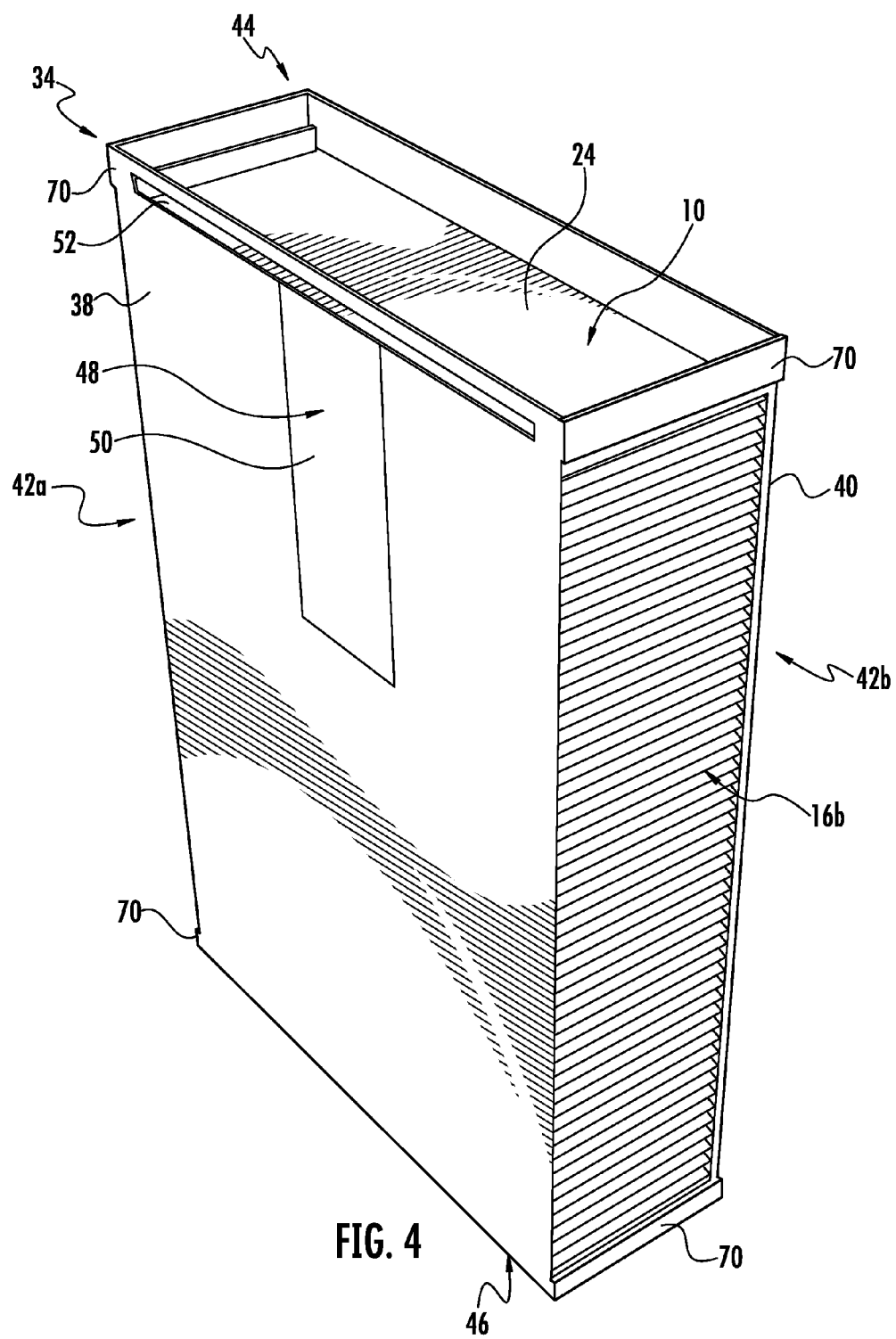
FIG. 4 shows data storage tape arranged in a concertina format received in the inner cartridge in accordance with one embodiment disclosed within this specification.

The data storage tape 10 arranged in concertina format can be received in the inner cartridge 34. An example of such an arrangement is shown in FIG. 4. The data storage tape 10 can be inserted into the inner cartridge 34 through one of the open lateral sides 42*a*, 42*b* and/or through the open top side 44 of the inner cartridge 34. At least a portion of the first fold side 16*a* and/or the second fold side 16*b* of the data storage tape 10 in concertina format can be visible and/or accessible from the outside of the inner cartridge 34 through a respective one of the open lateral sides 42*a*, 42*b*. More particularly, the machine-readable indicia 30 provided on the first and/or second fold sides 16*a*, 16*b* can be visible and/or accessible from the outside the inner cartridge 34 through a respective one of the open lateral sides 42*a*, 42*b*. Further, one of the first end tape segment 24 and the second end tape segment 26 can be visible and/or accessible from the outside the inner cartridge 34 through at least one of the open top side 44 or the bottom side 46 of the inner cartridge 34.

FIG. 3 shows an example of an outer cartridge 36. The outer cartridge 36 can have any suitable form. As is shown, the outer cartridge 36 can be generally rectangular in conformation. However, other conformations are possible. The outer cartridge 36 can be hollow. The outer cartridge 36 can be sized and/or shaped to receive the inner cartridge 34 therein.

The outer cartridge 36 can be made of any suitable material. For instance, the outer cartridge 36 can be made of any suitable type of plastic. The outer cartridge 36 can be made of a non-magnetic material. The outer cartridge 36 can be a substantially rigid structure. The outer cartridge 36 can be made of the same material as the inner cartridge 34, or they can be made of different materials.

The outer cartridge 36 can include a substantially open front side 54. The outer cartridge 36 can include a back side 56, which can be defined by a back wall 58. The outer cartridge 36 can include opposing lateral side walls 60*a*, 60*b*. The outer cartridge 36 can include a top wall 62 and bottom wall 64. Again, terms such as "front," "back," "lateral," "top," "bottom" and the like are used merely for convenience to facilitate the description based on the orientation of the outer cartridge 36 shown in FIG. 3. It will be understood that these terms are not intended to be limiting.

The outer cartridge 36 can include machine-readable indicia 66 thereon. For instance, the machine-readable indicia 66 can be provided in any suitable location on an exterior surface of the outer cartridge 36. In one implementation, the machine-readable indicia 66 can be provided on at least one of the lateral side walls 60*a*, 60*b* of the outer cartridge 36. As will be explained in greater detail later, providing the machine-readable indicia 66 on the outer cartridge 36 can be used to facilitate identification and retrieval of the correct data storage tape 10 from a tape library. The machine-readable indicia 66 can provide any suitable information. For instance, the machine-readable indicia 66 can represent a unique identifier for the data storage tape 10 within the housing.

The machine-readable indicia 66 can be included on the outer cartridge 36 in any suitable manner, including, for example, by printing, stamping or marking. In one implementation, the machine-readable indicia 66 can be provided on a sticker or other substrate that is attached to the outer cartridge 36 in any suitable manner, such as by an adhesive.

The machine-readable indicia 66 can be provided in any suitable form, including, for example, barcodes (e.g., UPC, EAN, PDF417, QR code format, etc.), binary encoding, photosymbols, standard or specialized text, etc., or any future type of machine-readable indicia. The machine-readable indicia 66 can be read by, for example, a camera, scanner, optical reader or other device depending on the form of the machine-readable indicia 66.

The outer cartridge 36 can be configured to receive the inner cartridge 34 therein. In one implementation, the outer cartridge 36 and/or the inner cartridge 34 can be configured to facilitate relative movement between the outer cartridge 36 and the inner cartridge 34. For instance, the outer cartridge 36 can include one or more channels 68 formed in an interior surface thereof (two channels 68 are visible in FIG. 3). More particularly, the channels 68 can be formed on an interior surface of the lateral sides 60*a*, 60*b* of the outer cartridge 36. The channels 68 can extend in a direction from the front side 54 to the back side 56 of the outer cartridge 36. In one embodiment, there can be four channels 68. In such case, two channels 68 can be provided in a lower region of the outer cartridge 36, and two channels 68 can be provided in an upper region of the outer cartridge 36.

Further, the inner cartridge 34 can include one or more protrusions 70. The protrusions 70 can be provided in any suitable location on the inner cartridge 34. More particularly, the protrusions 70 can be formed on an exterior surface of the inner cartridge 34. More particularly, the protrusions 70 can be formed on an exterior surface of the lateral sides 42, 42*b* of the inner cartridge 34 and can extend laterally outward therefrom. The protrusions 70 can have any suitable size and shape. In one implementation, the protrusions 70 can be generally rectangular. In one embodiment, there can be four protrusions 70. In such case, two protrusions 70 can be provided in a lower region of the inner cartridge 34, and two protrusions 70 can be provided in an upper region of the inner cartridge 34.

Each of the protrusions 70 can be configured to be received in a respective one of the channels 68 in the outer cartridge 36. More particularly, the protrusions 70 can be configured to be substantially matingly received in the respective channels 68 in the outer cartridge 36. The channels 68 and the protrusions 70 can be configured to permit the inner cartridge 34 and the outer cartridge 36 to be moved relative to each other, such as by sliding motion. Of course, it will be appreciated that the opposite arrangement can be provided in which one or more protrusions 68 can be provided on the outer cartridge 36 and one or more channels 70 can be provided in the inner cartridge 34.

The outer cartridge 36 can be configured to retain the inner cartridge 34 therein. Any suitable manner of retention can be provided. For instance, the outer cartridge 34 can include a flap 72, as is shown in FIG. 3. The flap 72 can be located to cover at least a portion of the open front side 54 of the outer cartridge 36. In one implementation, the flap 72 can be located in an upper region of the outer cartridge 36. Alternatively, the flap 72 can be located in a lower region of the outer cartridge 36. The flap 72 can be movably connected to the outer cartridge 72. More particularly, the flap 72 can be pivotably connected to the outer cartridge 36. As an example, the flap 72 can be attached to the outer cartridge 36 by one or more hinges, spring or other suitable structure, system or arrangement.

Figure 5:
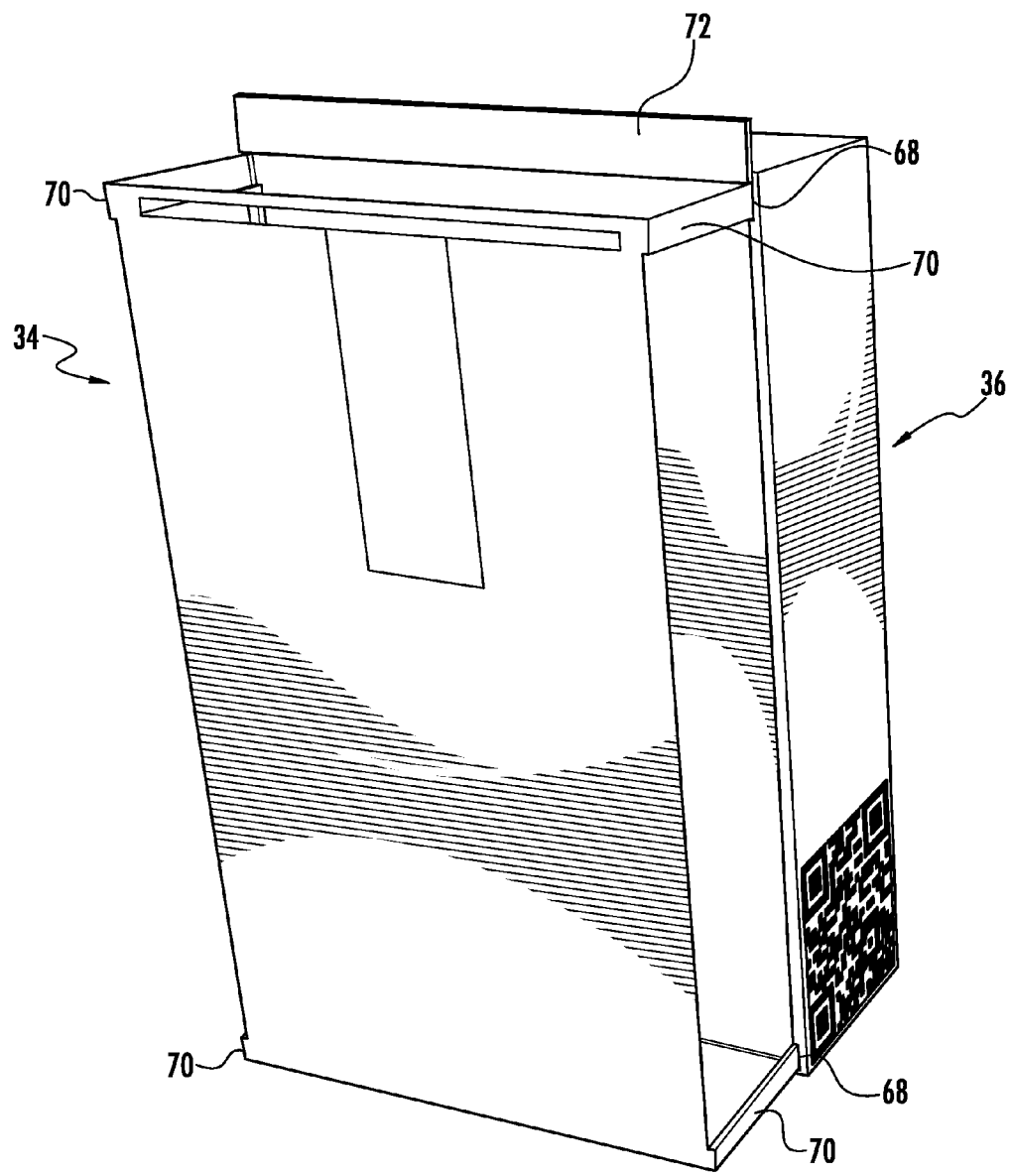
FIG. 5 shows an example of an inner cartridge movable with respect to the outer cartridge in accordance with one embodiment disclosed within this specification.

The flap 72 can be movable between a closed configuration and an open configuration. FIG. 3 shows an example of when the flap 72 is in a closed configuration. In such a configuration, the inner cartridge 34 is prevented from being removed from the outer cartridge 36. FIG. 5 shows an example of when the flap 72 is in an open configuration. In such a configuration, relative movement between the inner cartridge 34 and the outer cartridge 36 can be permitted. In one arrangement, the flap 72 can be biased in the closed configuration. The housing can be configured to facilitate movement of the flap 72 between the closed configuration and the open configuration. For instance, the housing can include a pin, button, or other element that, when engaged by another element, causes the flap 72 to move from the closed configuration to the open configuration or at least releases the flap 72 so that it can be moved from the closed configuration to the open configuration.

Figure 6:
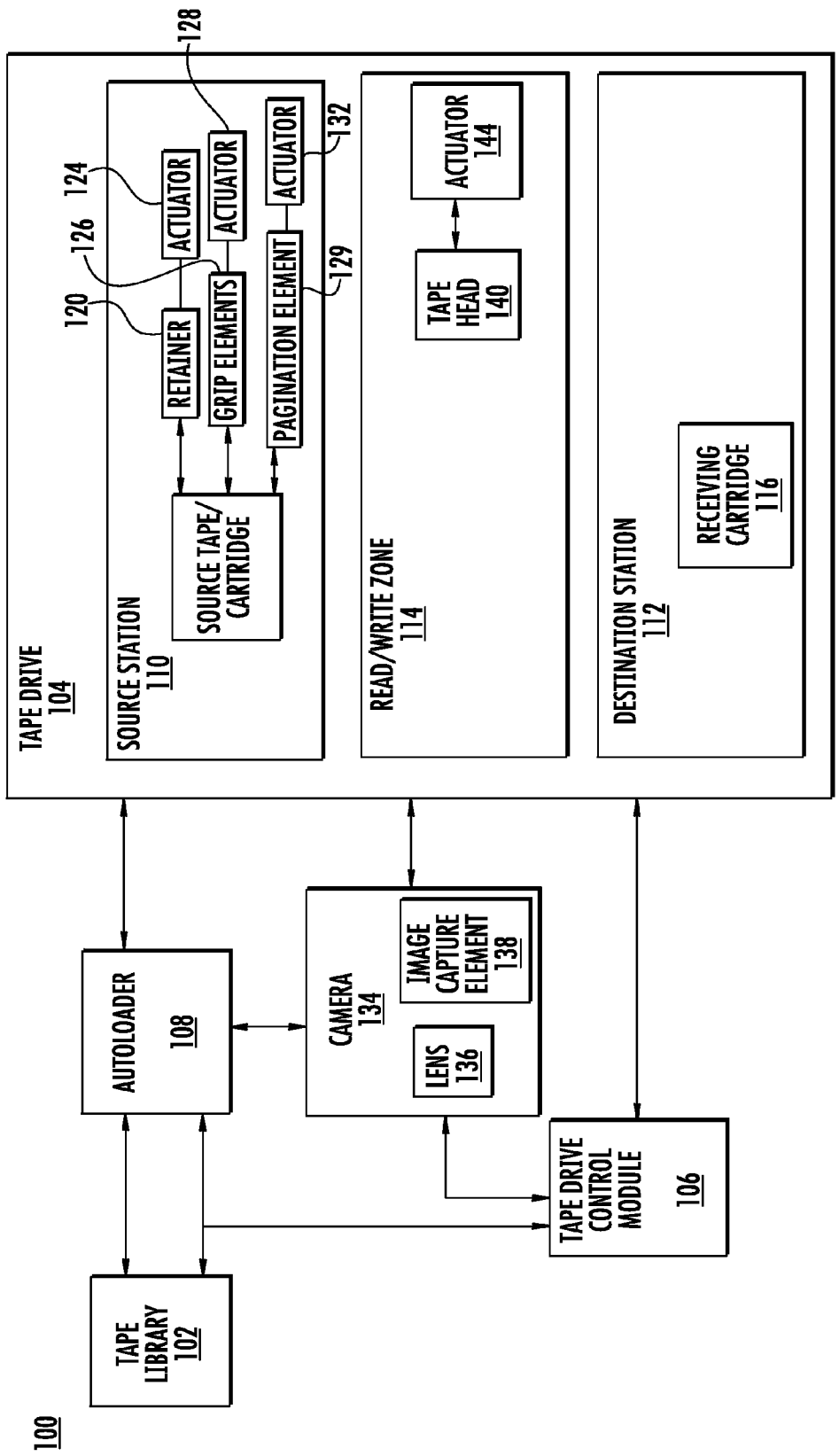
FIG. 6 is a block diagram illustrating a system for a data storage tape arranged in a concertina format in accordance with one embodiment disclosed within this specification.

An example of a system 100 in which the above-described data storage tape 10 in concertina format can be used is shown in FIG. 6. The system 100 can include a tape library 102. A "tape library" is any repository that includes one or more data storage tapes. One of the data storage tapes in the tape library 102 can be the data storage tape 10 arranged in concertina format. The system 100 can include a tape drive 104. A "tape drive" is defined as any device, component or system that can read data from and/or write data to a data storage tape. The tape drive 104 can be operatively connected to a tape drive control module 106.

The system 100 can include an autoloader 108. An "autoloader" 108 is defined as one or more devices, components and/or systems that can select a tape from the tape library, transfer the selected tape to the tape drive and/or load the selected tape in the tape drive. The autoloader 108 can include a robot. The autoloader 108 can be operatively connected to a system controller. It will be appreciated that, in some instances, one or more of the operations of the autoloader 108 can be performed by a user (e.g. a person).

The tape drive 104 can have any suitable configuration. The tape drive 104 can include a tape source station 110 and a tape destination station 112. A read/write zone 114 can be located between the tape source station 110 and the tape destination station 112. The tape source station 110 can be configured to receive a data storage tape 10 arranged in concertina format therein. As noted above, the data storage tape 10 arranged in concertina format may be provided in a housing.

In one implementation, the tape source station 110 can be arranged opposite to the tape destination station 112. The tape source station 110 and the tape destination station 112 can be vertically spaced from each other. Any suitable spacing can be provided. At least initially, the tape source station 110 can be located at a higher vertical elevation that the tape destination station 112. For instance, the tape source station 110 can include a source tape or source cartridge 111, which can be the data storage tape 10. The tape source station 110 can include any suitable elements to receive the data storage 10 or to hold the data storage tape 10 in place.

The destination station 112 can include a receiving cartridge 116, which can be similar or identical to the inner cartridge 34 described above. In some instances, the receiving cartridge 116 can be placed in the destination station 112. In other instances, a receiving cartridge 116 can be permanently or removably mounted in the destination station 112. At least a portion of the tape source station 110 can be substantially vertically aligned with at least a portion of the tape destination station 112. For instance, the source tape or source cartridge 111 of the source station 110 can be substantially aligned with the receiving cartridge 116.

The tape drive 104 can be adapted to engage the housing of the data storage tape 10 to expose the data storage tape 10 for use in the tape drive 104. For instance, in the housing configuration described above in which there is an outer cartridge 36 and an inner cartridge 34, the tape drive 104 can be configured to slide the inner cartridge 34 out of the outer cartridge 36 so that the data storage tape 10 can be accessed. In one implementation, the tape drive 104 can engage the housing of the data storage tape 10 so as to cause the flap 72 to move from the closed configuration to the open configuration or at least releases the flap 72 so that it can be moved from the closed configuration to the open configuration.

Figure 7:
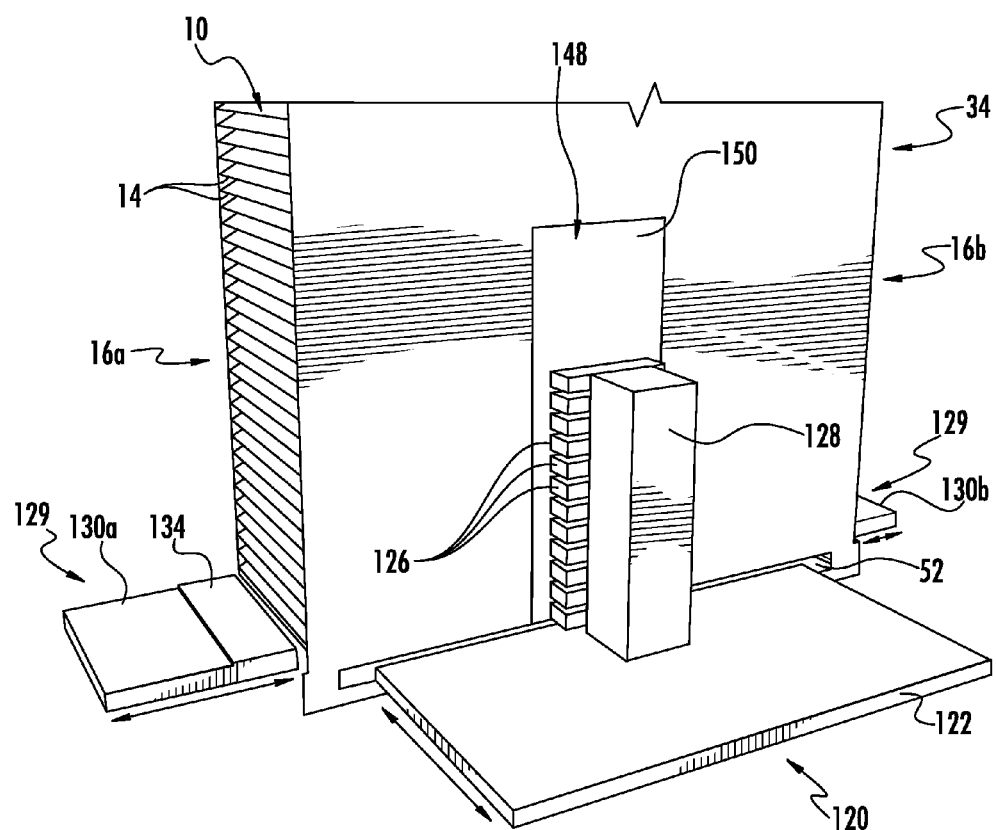
FIG. 7 shows an example of a portion of a tape drive system for a data storage tape arranged in a concertina format in accordance with one embodiment disclosed within this specification.

To read, write or access the data storage tape 10, the inner cartridge 24 can be oriented so that the open top side 44 is in a generally downward direction. In such an orientation, the data storage tape 10 can be dispensed from the inner cartridge 24 through the open top side 44 thereof. An example of such an orientation is shown in FIG. 7. The inner cartridge 34 may be placed in the tape source station 110 in such an orientation. However, the tape drive 104 can be configured to invert the inner cartridge 34 so that the open top side 44 is oriented in a generally downward direction. There are other operational conditions in which the inner cartridge 34 may be oriented with the top side 44 is facing in a generally downward direction. Such an orientation may occur, for example, when resetting at least a portion of the data storage tape 10 in the inner cartridge 34.

The tape drive 104 can be configured to retain the data storage tape 10 in the inner cartridge 34 to prevent it from unintentionally falling through the open top side 44 of the inner cartridge 34. To that end, the tape drive 104 can include a retainer 120. The retainer 120 can have any suitable configuration. For instance, the retainer 120 can be a catch plate 122. The catch plate 122 can have any suitable configuration. One example of a catch plate 122 is shown in FIG. 7. In one implementation, the catch plate 122 can be substantially rectangular.

The retainer 120 can be configured to engage the inner cartridge 34 so as to retain the data storage tape 10 therein when the inner cartridge is oriented when an open side, such as the top side 44, is facing in a generally downward direction. For instance, the retainer 120 can be received in the slot 52 in the inner cartridge 34. In one implementation, the retainer 120 can substantially entirely close the open top side 44 of the inner cartridge 34. Alternatively, the retainer 120 can close a portion of the top side 44 of the inner cartridge 34. Regardless of the exact configuration, the data storage tape 10 is prevented from passing through the top side 44 of the inner cartridge 34 when the inner cartridge 34 is oriented such that the top side 44 is facing in a generally downward direction.

The retainer 120 can be movable in any suitable manner. For instance, the retainer 120 can be operatively connected to one or more actuators 124. The term "actuator" means any component or group of components that are configured to convert a source of energy into motion. The actuator can be a mechanical-based (e.g. hydraulic, pneumatic, etc.), electric-based (e.g. electrical current), and/or software-based (e.g. an actuator driver, robot control system, etc.), and/or combinations thereof, just to name a few possibilities.

The one or more actuators 124 can move the retainer 120 between at least a retracted position and an extended position. In the retracted position, the retainer 120 does not cover or otherwise engage the inner cartridge 34 and/or data storage tape 10 such that the data storage tape 10 can pass through the open top side 44 of the inner cartridge 34. In the extended position, the retainer 120 can cover or otherwise engages the inner cartridge 34 and/or data storage tape 10 to prevent the data storage tape 10 from passing through the open top side 44 of the inner cartridge 34. The movement of the retainer 120 and/or the one or more actuators 124 can be effected by the tape drive control module 106. The actuators 124 can be operatively connected to the tape drive control module 106.

The tape drive 104 can also be configured to retain selected portions of the data storage tape 10 in place in the inner cartridge 34 and/or to release large portions of the data storage tape 10 for transfer to the destination station 112. As an example, the tape drive 104 can be configured to directly or indirectly engage the front and/or back sides 18, 20 of the data storage tape 10. For instance, the tape drive 104 can include one or more grip elements 126. The grip elements 126 can be made of any suitable material, including, for example, rubber or a relatively soft material to minimize abrasion or wear of the data storage tape 10.

When there is a plurality of grip elements 126, the grip elements 126 can be controlled individually, collectively and/or controlled in or more subsets. The grip elements 126 can be operatively connected to the tape drive control module 106. In one implementation, the grip elements 126 can be moved by actuators 128. The above-discussion of actuators 124 made in connection with the retainer 120 applies equally to the one or more actuators 128 associated with the grip elements 126. In one embodiment, the one or more actuators 128 can include a solenoid actuator that presses a pin against a respective one of the grip elements 126.

The one or more grip elements 126 can be selectively moved between at least a refracted position and an extended position. In the retracted position, the one or more grip elements do not directly or indirectly engage the data storage tape 10. In the extended position, the one or more grip elements 126 can directly or indirectly engage the data storage tape 10. The one or more grip elements 126 can directly or indirectly engage any suitable portion of the data storage tape 10. For instance, the one or more grip elements 126 can directly or indirectly engage a portion of the front and/or back sides 18, 20 of the data storage tape 10. One example of an indirect manner of engagement between the one or more grip elements 126 and the data storage tape 10 is shown in FIG. 7. The one or more grip elements 126 can engage the pliant region 48 of the inner cartridge 34. The one or more grip elements 126 can be configured to selectively apply a force against the pliant region 48 such that the pliant region 48 moves inwardly into contact with the front side 18 or the back side 20 of the data storage tape 10, thereby holding the data storage tape 10 in place.

In one implementation, each of the grip elements 126 may initially be in the extended position. One or more grip elements 126 can be selectively moved into the retracted position to release an associated portion of the data storage tape 10. In such case, if the inner cartridge 34 is oriented in the tape source station 110 so that the top side 44 is oriented generally downward, the released portion of data storage tape 10 can be allowed to fall through the open top side 44 due at least to gravity. The released portion of data storage tape 10 can be received in the destination station 112, such as in the receiving cartridge 116. The receiving cartridge 116 can be substantially aligned with the inner cartridge 34.

Figure 8:
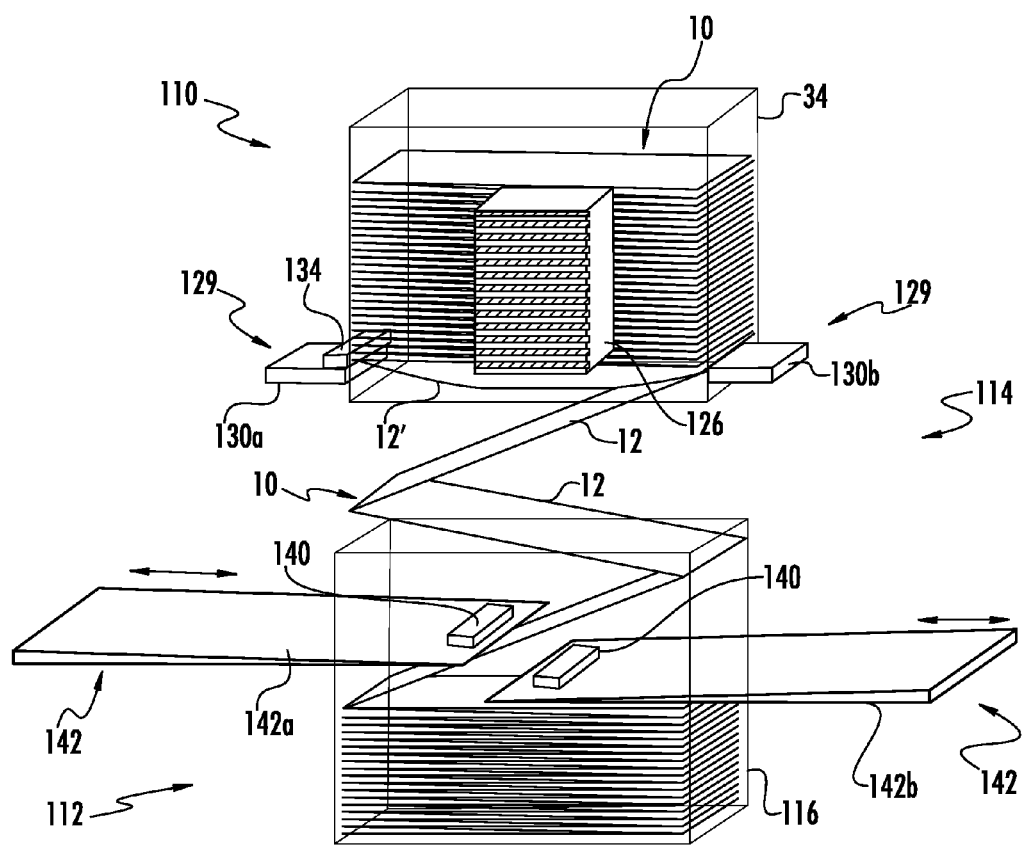
FIG. 8 shows an example of a portion of a tape drive system for a data storage tape arranged in a concertina format in accordance with one embodiment disclosed within this specification.
Figure 9:
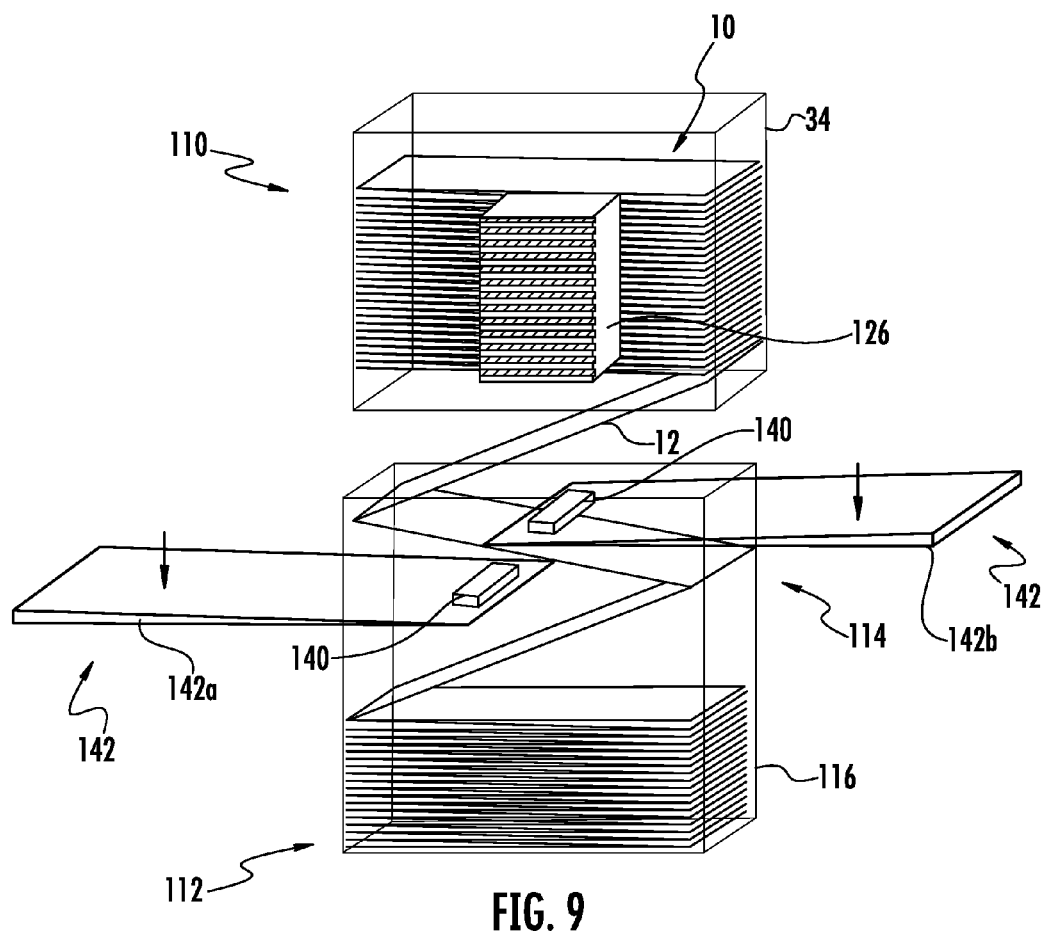
FIG. 9 show an example of a portion of a tape drive system for a data storage tape arranged in a concertina format in accordance with one embodiment disclosed within this specification.

The tape drive 104 can be configured to allow pagination of individual tape segments 12 of the data storage tape 10. To that end, the tape drive 104 can include one or more pagination elements 129 to engage individual folds 14 of the data storage tape 10. As an example, the pagination elements 129 can include two, opposing pagination bars 130a, 130b. The pagination bars 130 can be configured to engage an outermost tape segment 12' of the data storage tape 10. The outermost tape segment 12' is the tape segment 12 that is next to be dispensed from the tape source station 110 (e.g. the next tape segment that will be passed through the open top side 44 of the inner cartridge 34). An example of such an arrangement is shown in FIG. 8. A first pagination bar 130a can engage a tape fold 14 on one side of the outermost tape segment 12', and a second pagination bar 130b can engage a tape fold 14 on the opposite side of the outermost tape segment 12'.

As the second pagination bar 130b engages the tape fold 14 on one side of the outermost tape segment 12', the first pagination bar 130a can push the tape fold 14 toward the middle of the inner cartridge 34. As a result, the outermost tape segment 12' can bow, as is shown in FIG. 8. The outermost tape segment 12' will release from the pagination bars 130a, 130b, as will be explained in greater detail below, at least in part to pressure applied to the data storage tape 10 from other elements below (e.g. tape heads). The released outermost tape segment 12' can fall under gravity toward the destination station 112. The first and/or second pagination bars 130a, 130b may be moved so as to engage the folds 14 of the next outermost tape segment 12'.

The one or more pagination elements 129 can be selectively moved between at least a retracted position and an extended position. In the retracted position, the pagination elements 129 do not engage the folds 14 of the data storage tape 10. In the extended position, the one or more pagination elements 129 can engage the data storage tape 10 and, more particularly, the folds 14 of the data storage tape 10. In one implementation, the one or more pagination elements 129 can be moved by actuators 132. The above-discussion of actuators 124 made in connection with the retainer 120 applies equally to the one or more actuators 132 associated with the pagination elements 129.

The pagination elements 129 can be used when individual tape segments 12 are to be reviewed one at a time or when a specific data area including a plurality of tape segments 12 is being accessed. The pagination elements 129 can be in the retracted position when a plurality of tape segments 12 is transferred from the source station 110 to the destination station 112.

The system can include one or more cameras 134. A "camera" is defined as any device, component or system that can capture, scan, process, read a machine readable indicia. The camera can be a camera, scanner, optical reader or other device depending on the form of the machine-readable indicia. The camera 134 can include a lens 136 and an image capture element 138. The image capture element 138 can be any suitable type of image capturing device or system, including, for example, an area array sensor, a Charge Coupled Device (CCD) sensor, a Complementary Metal Oxide Semiconductor (CMOS) sensor, a linear array sensor, a CCD (monochrome). The one or more cameras 134 can be operatively connected to the tape drive control module 106.

In one implementation, the camera 134 can be provided to read the machine-readable indicia 66 on the housing for the data storage tape 10. In such case, the camera 134 can be included as part of the autoloader 108. Alternatively or in addition, the camera 134 can be provided to read the machine-readable indicia 30 provided on the data storage tape 10. The camera 134 can read the machine-readable indicia 134 and can convert the machine-readable indicia 30 into a number. Such information can be used to track the approximate tape location. The number can correlate to the corresponding grip elements 126 that engage the data storage tape 10. The number can also be used to cross-reference the unique number on every tape fold 14. The unique number can be read to check that it is the actual tape fold 14 that is required where the data is located. In one embodiment, it can be integrated into one of the pagination elements 129. The camera 134 can read number of the fold 14 of the current outermost tape fold segment 12' to determine whether a release a large quantity of tape.

It should be noted that many of the above components of the system 100 described above are associated with the tape source station 110. However, it will be appreciated that one or more of these components can be associated with the destination station 112. Further, the relative positions of the tape source station 110 and the destination station 112 can be reversed, as described herein. In such case, the tape destination station 112 can be located at a higher vertical elevation that the tape source station 110. In such an arrangement, the data storage tape 10 can be transferred from the tape destination station 112 to the tape source station 110, as may occur when use of the data storage tape 10 is completed or when a selected or identified data area of the data storage tape 10 has already passed through the read/write zone 114.

The relative positions of source station 110 and the destination station 112 can be reversed in any suitable manner. For instance, the source station 110 and the destination station 112 can be moved together or separately into a new position. For instance, the tape drive 104 can be mounted on or attached to a rotating member that can rotate the tape drive 104 about 180 degrees. Alternatively, the source cartridge and the destination cartridge can be removed from their respective stations. The source cartridge can be placed in the destination station, and the destination cartridge can be placed in the source station.

The tape drive 104 can include one or more tape heads 140. "Tape head" is defined as any device, component or system that can read data from and/or write data to a data storage tape. In one implementation, the tape heads 140 can be operatively positioned between the source station 110 and the destination station 112. Alternatively or in addition, the tape heads 140 can be operatively positioned within or configured to operate within at least a portion of the source station 110 and/or the destination station 112.

The tape heads 140 can be movable horizontally, vertically and/or combinations thereof. The tape heads 140 can be provided on support members 142. In one implementation, there can be two support members 142a, 142b, one provided on each side of the read/write zone 114 between the source station 110 and the destination station 112. A tape head 140 can be provided near a distal end 144 of each support arm 142. In one example, a tape head 140 can be provided on both sides of the support arm 142 (only one of which is visible in FIGS. 8-10). Such a configuration can facilitate instances when the positions of the source station 110 and the destination station 112 are reversed, as noted above.

Movement of the tape heads 140 and/or the support members 142 can be achieved in any suitable manner. For instance, the tape heads 140 and/or the support members 142 by one or more actuators 144 (FIG. 6). The above-discussion of actuators 124 made in connection with the retainer 120 applies equally to the one or more actuators 144 associated with the tape heads 140 and/or the support members 142. The tape heads 140, the support members 142 and/or the actuators 144 can be operatively connected to the tape drive control module 106.

As tape segments 12 are transferred from the source station 110 to the destination station 112, the tape heads 140 can be moved so that data can be read from and/or written to the data storage tape 10. For instance, the tape heads 140 can be moved in a generally horizontal manner or lateral in and out manner.

One or more of the tape heads 140 and/or one or more of the support members 142 can also be used to facilitate releasing tape segments 12 from the pagination elements 129 and/or the grip elements 126. As an example, one or more of the tape heads 140 and/or one or more of the support members 142 can be moved vertically up and/or down to apply a slight downward pressure or pulling on the data storage tape 10. Such pressure or pulling can cause the data storage tape 10 in engagement with the pagination elements 129 (e.g. outermost tape segment 12') and/or the grip elements 126 to be released. As a result, the released portion of the data storage tape 10 can be gravity fed to the destination station 112.

In one implementation, an appropriate amount of pressure or pulling can be applied to the data storage tape 10 by a single tape head 140 and/or support member 142. Alternatively, two tape heads 140 and/or two support members 142 can cooperatively apply an appropriate amount of pressure or pulling to the data storage tape 10. For instance, with respect to FIG. 9, the support member 142b can be moved so that it is above the support member 142a. The support member 142b can move laterally inward to read/write to the tape storage tape 10. In some implementations, such motion can cause the outermost tape segment 12' to be pulled from the source station 110. The support member 142b may also be moved downwardly as well.

The process can continue with the support member 142a being moved so that it is above the support member 142b. The support member 142a can move laterally inward to read/write to the data storage tape 10. As it does so, it can cause the outermost tape segment 12' to be pulled from the source station 110. The support member 142a may also be moved downwardly as well. This alternating process can repeat for subsequent tape segments 12.

After the tape heads 140 have read or written to the data storage tape 10, the tape heads 140 and/or the support members 142 can be used to fold the tape segments 12 in the receiving cartridge 116. In such case, the support members 142 can move into the receiving cartridge 116, such as by accessing the data storage tape 10 in the receiving cartridge 116 through open lateral sides of the cartridge.

Figure 11:
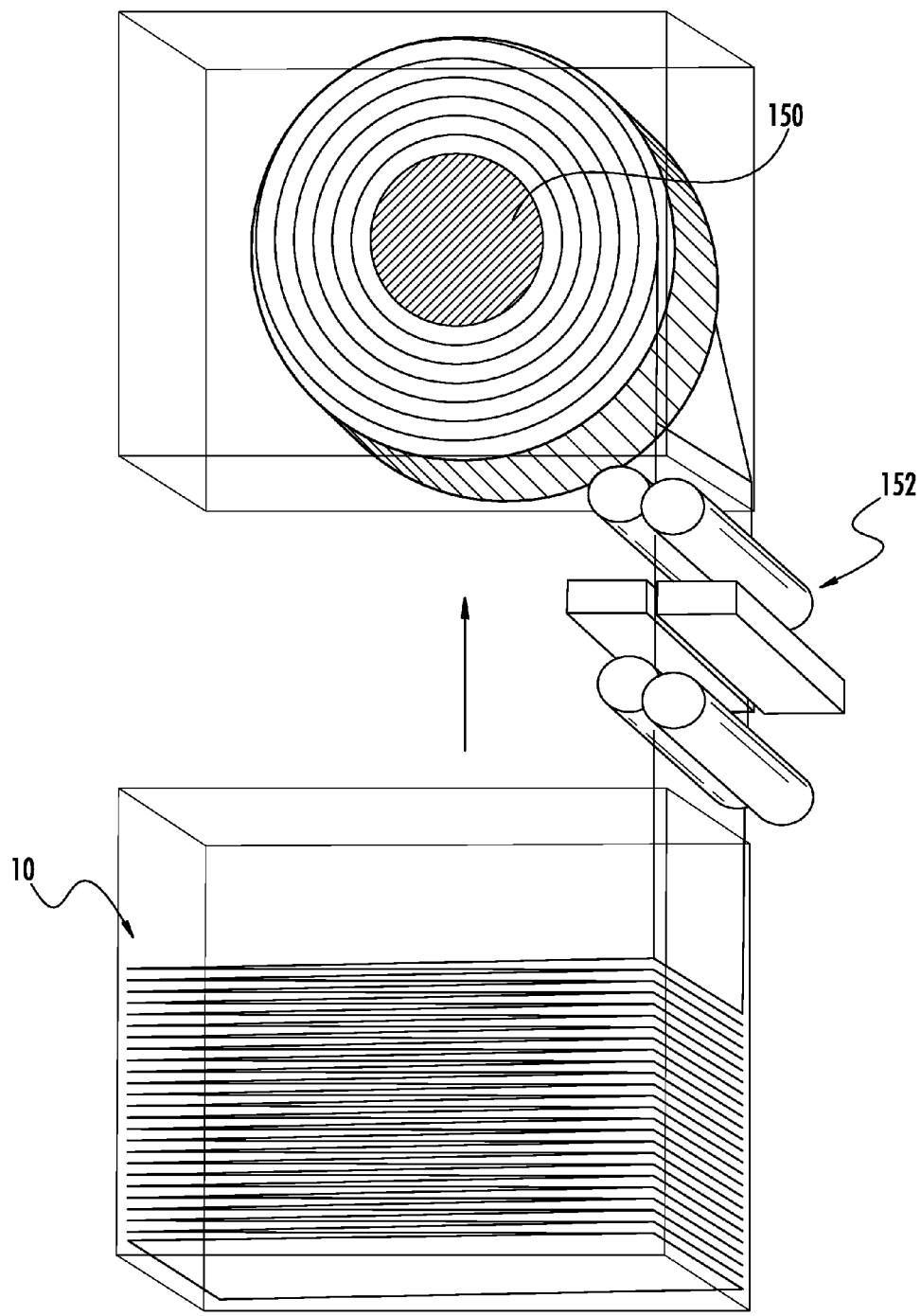
FIG. 11 shows an example of a portion of a tape drive system in which a data storage tape arranged in a concertina format is spooled onto a reel in accordance with one embodiment disclosed within this specification.

In some instances, it may be desired to read data from, write data to and/or access data from at least a portion of the data storage tape 10 arranged in a concertina format in a sequential manner. In such case, the tape segments 12 can be accessed sequentially from the data storage tape 10 and rolled onto a spool or folded into another cartridge. An example of such an arrangement is shown in FIG. 11. As is shown, the data storage tape 10 in concertina format is pulled from the source cartridge and rolled onto a spool 150. Tape heads 152 suitable to read date from or write data to the data storage tape 10 can be provided. The arrangement shown in FIG. 11 can be a part of the tape drive 106. For instance, the spool 150 can be provided in the destination station 112. Alternatively, the arrangement shown in FIG. 11 can be provided in a separate tape drive or system. Of course, one implementation can include a reverse situation in which data storage tape provided on a spool can be folded into a housing using the tape heads 140 and/or the support members 142.

Non-sequential access to portions of the data storage tape can be achieved by going directly to or close to an identified or selected tape segment that holds the data of interest. The non-sequential methods described herein can effectively provide random access to data on a data storage tape. It will be appreciated that such non-sequential manner of accessing portions of the data storage tape 10 can significantly reduce the amount of time required to read, write or access data compared to conventional sequential methods.

The data of interest can be initially located using the file allocation table provided on an end tape segment 24, 26 of the data storage tape 10. The file allocation table can indicate at least a data area in which the data of interest resides. The data area can include one or more tape segments 12. The data area may correspond to an indicator associated with one or more tape segments. For instance, the indicator may correspond to the machine-readable indicia 30 provided on the first and/or second tape fold side 16a, 16b of the data storage tape 10.

Figure 10:
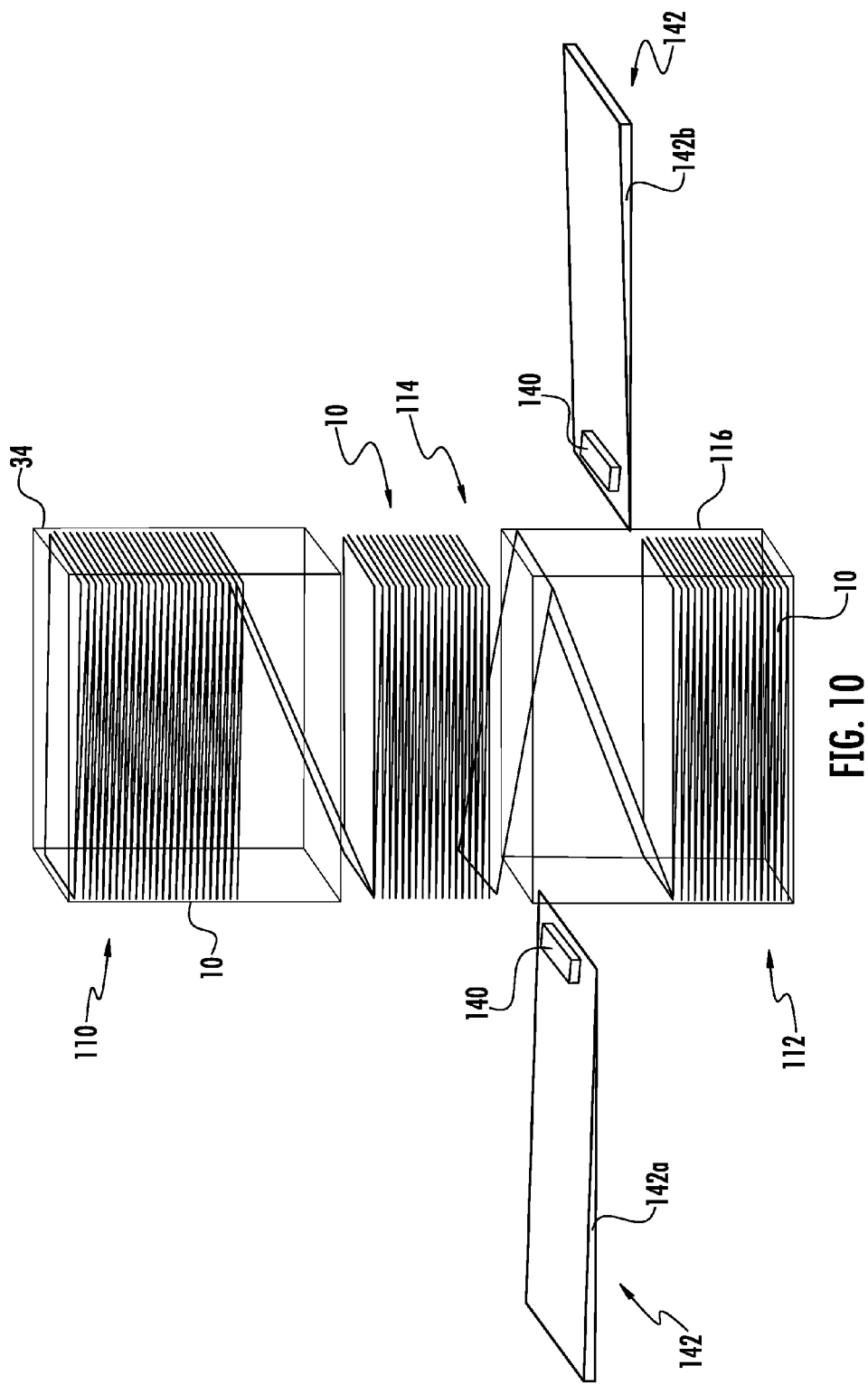
FIG. 10 show an example of a portion of a tape drive system for a data storage tape arranged in a concertina format in accordance with one embodiment disclosed within this specification.

Any suitable amount of data storage tape 10 can be released so that the data area of interest resides can be accessed. The grip elements 126 and/or the pagination elements 129 can be used, as described above, to hold and release one or more tape segments 12 of the data storage tape 10 to the appropriate location of the data area of interest. FIG. 8 shows an example in which a single tape segment 12 is being released at a time. FIG. 10 shows an example in which a plurality of tape segments 12 are released together at one time, as may be done when the data of interest is located in a remote portion of the data storage tape 10.

In some instances, a plurality of tape segments may be released to get to or near an area, such as a group area, of the data storage tape in which the data of interest is stored, as may be indicated by the file allocation table. After that, one tape segment at a time can be released until the data of interest is located. As the released tape segments are transferred from the source station 110 to the destination station 112, the tape heads 140 can move in and out of the areas between the tape segments 12 to read data from the data storage tape 10.

Likewise, if it is desired to write data to the data storage tape 10, the tape drive 104 can access an available data area of one or more of the tape segments in the same manner. The tape drive 104 can release a determined number of tape segments 12 so that the identified data area can enter the read/write zone 114. Data can be written to the data area using the tape heads 140. If data is written to the data storage tape 10 or otherwise modified on the data storage tape 10, the file allocation table can be updated accordingly in any suitable manner.

In some instances the data sought may have already passed through the read/write zone 114 of the tape drive 104 (e.g. the data area is already in the receiving cartridge 116). In such case, the source cartridge and the destination cartridges and/or the source station and the destination station can be reversed. For instance, the source station and the destination station can be inverted in any suitable manner. As an example the tape drive can be configured to rotate the source station and the destination station about 180 degrees. As a result, the destination station/cartridge can become the source station/cartridge. Likewise, the source station/cartridge can become the destination station/cartridge. In this way, the data storage tape 10 can be passed back toward the original source cartridge. Such a manner of operation can also be used when use of the data storage tape 10 is completed and the data storage tape 10 is to be returned to the tape library 102. Further, it will be appreciated that, due to the tape heads 140 being provided on both sides of the support elements 142, data can be written to and/or read from the data storage tape 10 in the inverted orientation.

Figure 12:
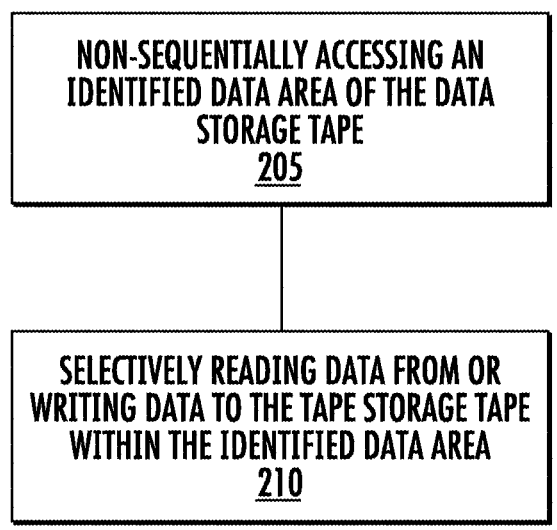
FIG. 12 is a flow chart illustrating a method for non-sequential access of data from a data storage tape in accordance with one embodiment disclosed within this specification.

FIG. 12 is a flow chart illustrating a method 200 of non-sequential access of data from a data storage tape in accordance with one embodiment disclosed within this specification. Various possible steps of method 200 will now be described. The method 200 illustrated in FIG. 12 may be applicable to the embodiments described above in relation to FIGS. 1-11, but it is understood that the method 200 can be carried out with other suitable systems and arrangements. Moreover, the method 200 may include other steps that are not shown here, and in fact, the method 200 is not limited to including every step shown in FIG. 12. The steps that are illustrated here as part of the method 200 are not limited to this particular chronological order, either. Indeed, some of the steps may be performed in a different order than what is shown and/or at least some of the steps shown can occur simultaneously.

At step 205, an identified data area of the data storage tape can be accessed non-sequentially. Non-sequentially accessing an identified data area of the data storage tape can include selectively releasing a portion of the data storage tape arranged in a concertina format such that the identified data area of the data storage tape is presented in a read/write zone. Releasing a portion of the data storage tape arranged in a concertina format can include releasing one tape segment at a time, or it can include releasing a plurality of tape segments together. At step 210, data can be selectively read from or written to the tape storage tape within the identified data area.

Figure 13:
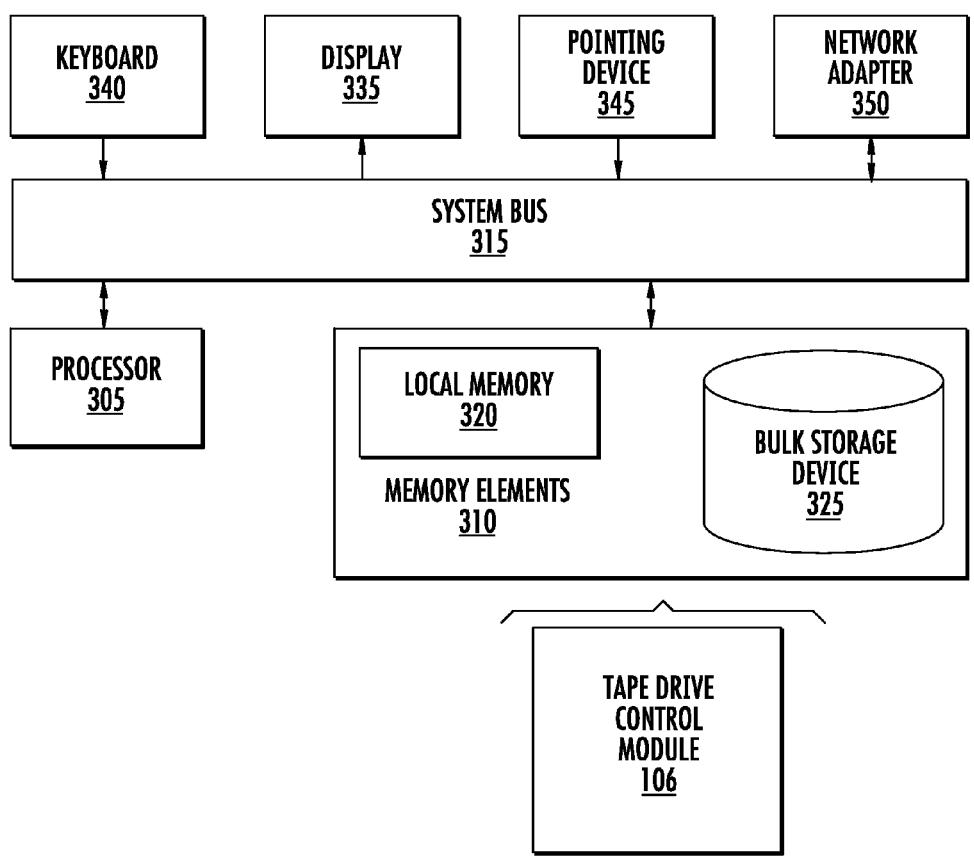
FIG. 13 is a block diagram illustrating a system for allowing non-sequential access of data from a data storage tape in accordance with one embodiment disclosed within this specification.

FIG. 13 is a block diagram illustrating an example of a data processing system 300. System 300 can include at least one processor (e.g., a central processing unit) 305 coupled to memory elements 310 through a system bus 315 or other suitable circuitry. As such, system 300 can store program code within memory elements 310. Processor 305 executes the program code accessed from memory elements 310 via system bus 315 or the other suitable circuitry.

In one aspect, system 300 is implemented as a computer or other programmable data processing apparatus that is suitable for storing and/or executing program code. It should be appreciated, however, that system 300 can be implemented in the form of any system including a processor and memory that is capable of performing and/or initiating the functions and/or operations described within this specification. Further, system 300 can be implemented in any of a variety of different form factors including, but not limited to, a portable device such as a mobile communication device, a tablet computing and/or communication device, a laptop computing device, a desktop computing device, a server, or the like.

Memory elements 310 include one or more physical memory devices such as, for example, local memory 320 and one or more bulk storage devices 325. Local memory 320 refers to RAM or other non-persistent memory device(s) generally used during actual execution of the program code. Bulk storage device(s) 325 can be implemented as a hard disk drive (HDD), solid state drive (SSD), or other persistent data storage device. System 300 also can include one or more cache memories (not shown) that provide temporary storage of at least some program code in order to reduce the number of times program code must be retrieved from bulk storage device 325 during execution.

Input/output (I/O) devices such as a keyboard 340, a display 335, and a pointing device 345 optionally can be coupled to system 300. The I/O devices can be coupled to system 300 either directly or through intervening I/O controllers. One or more network adapters 350 also can be coupled to system 300 to enable system 300 to become coupled to other systems, computer systems, remote printers, and/or remote storage devices through intervening private or public networks. Modems, cable modems, wireless transceivers, and Ethernet cards are examples of different types of network adapters 350 that can be used with system 300.

As pictured in FIG. 12, memory elements 310 can store a tape drive control module 106. The tape drive control module 106, being implemented in the form of executable program code, is executed by system 500 and, as such, is considered an integrated part of system 300. The tape drive control module 106 can determine the appropriate portion of the data storage tape 10 to release to access an identified data area on the data storage tape 10. The tape drive control module 106 can coordinate the movements of the retainer 120, the grip elements 126, the pagination elements 129 and/or the tape heads 140. The tape drive control module 106 can operate the one or more cameras 134 and/or the autoloader 108. The tape drive control module 106 can process information or data received from any portion of the system 100. Moreover, the tape drive control module 106, including any parameters and/or attributes utilized by module 106, are functional data structures that impart functionality when employed as part of system 300.

Any output of the tape drive control module 106 can be output to, and stored within, memory elements 310. As used herein, "outputting" and/or "output" can mean storing in memory elements 310, for example, writing to a file stored in memory elements 310, writing to display 335 or other peripheral output device, playing audible notifications, sending or transmitting to another system, exporting, or the like.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A data storage tape, comprising:
a plurality of tape segments arranged in a concertina format; and
a first end tape segment including a file allocation table, wherein
each tape segment is separated from a neighboring tape segment by a fold.

2. The data storage tape of claim 1, wherein
the plurality of tape segments have substantially equal lengths.

3. The data storage tape of claim 1, further comprising
a second end tape segment including a second file allocation table.

4. The data storage tape of claim 1, wherein
the plurality of tape segments include a first fold side defined by a plurality of folds, and
a machine-readable indicia is provided on the plurality of folds on the first fold side.

5. The data storage tape of claim 4, wherein
the machine-readable indicia is binary encoding.

6. The data storage tape of claim 4, wherein
the data storage tape is magnetic tape.

7. A method for non-sequential access of data from a data storage tape, comprising:
non-sequentially accessing an identified data area of the data storage tape; and
selectively reading data from or writing data within the tape storage tape within the identified data area, wherein
the data storage tape includes a plurality of tape segments arranged in a concertina format, and
each tape segment is separated from a neighboring tape segment by a fold.

8. The method of claim 7, wherein
the data storage tape includes a first end tape segment including a file allocation table.

9. The method of claim 7, wherein
the non-sequentially accessing includes selectively releasing a portion of the data storage tape such that the identified data area of the data storage tape is presented in a read/write zone.

10. The method of claim 9, wherein
one tape segment at a time is released.

11. The method of claim 9, wherein
a plurality of tape segments are released together.

* * * * *